US012554873B1

(12) United States Patent
Bendert et al.

(10) Patent No.: US 12,554,873 B1
(45) Date of Patent: Feb. 17, 2026

(54) SYSTEMS AND METHODS FOR LINKING REMOTE FILE STORAGE

(71) Applicant: Wells Fargo Bank, N.A., San Francisco, CA (US)

(72) Inventors: David Bendert, Charlotte, NC (US); Maximilian Fuchs, Charlotte, NC (US); Matthew Spain, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 309 days.

(21) Appl. No.: 18/165,693

(22) Filed: Feb. 7, 2023

(51) Int. Cl.
*G06F 21/62* (2013.01)
*G06F 16/13* (2019.01)
*G06F 16/16* (2019.01)
*G06F 21/60* (2013.01)

(52) U.S. Cl.
CPC ........ *G06F 21/6218* (2013.01); *G06F 16/134* (2019.01); *G06F 16/16* (2019.01); *G06F 21/602* (2013.01)

(58) Field of Classification Search
CPC .... G06F 21/6218; G06F 16/134; G06F 16/16; G06F 21/602
See application file for complete search history.

(56) References Cited

U.S. PATENT DOCUMENTS 8,296,301 B2 * 10/2012 Lunde ................ G06F 11/1461 707/738
8,417,954 B1 * 4/2013 Sagal ...................... G06F 21/64 713/176
9,411,864 B2 8/2016 Glider et al.
10,984,012 B2 4/2021 Li et al.
2013/0174280 A1 * 7/2013 Fujimori ............ H04N 1/32128 726/30

(Continued)

FOREIGN PATENT DOCUMENTS

CN 103685533 B 1/2017
WO WO-2005045686 A1 * 5/2005 ......... G06F 21/6245

OTHER PUBLICATIONS

Sliwa, Carol, "How to access cloud storage: Transfer, retrieval not so simple," Tech Target, Jan. 29, 2013, Web Page <https://www.techtarget.com/searchstorage/podcast/How-to-access-cloud-storage-Transfer-retrieval-not-so-simple> accessed on Aug. 19, 2022 (6 Pages).

(Continued)

*Primary Examiner* — Meng Li
(74) *Attorney, Agent, or Firm* — K&L Gates LLP

(57) ABSTRACT

Systems, apparatuses, methods, and computer program products are disclosed for linking remote file storage. An example method includes identifying, by discovery agent circuitry, a set of files for storage from a set of candidate files, and classifying, by file metadata circuitry, each file from the set of files for storage into file usage categories. The example method also includes assigning, by file metadata circuitry, permission categories to each file from the set of files for storage based on the file usage categories, and providing, by communications hardware, the set of files for storage and associated metadata to a file storage host, wherein the associated metadata comprises the file usage categories and the permission categories The example method also includes updating, by the discovery agent circuitry, content stored on the file storage host, the content comprising the set of files for storage.

20 Claims, 9 Drawing Sheets

(56) References Cited

U.S. PATENT DOCUMENTS

| | | | | |
|---|---|---|---|---|
| 2014/0123323 | A1* | 5/2014 | Jung | H04L 67/75 |
| | | | | 726/30 |
| 2014/0366143 | A1* | 12/2014 | Sandler | G06F 21/577 |
| | | | | 726/25 |
| 2019/0319987 | A1* | 10/2019 | Levy | H04L 63/08 |
| 2019/0361897 | A1* | 11/2019 | Bernstein | G06F 21/6227 |
| 2020/0201827 | A1* | 6/2020 | Chacko | G06F 16/188 |
| 2020/0250212 | A1* | 8/2020 | Macartney | G06F 16/3328 |
| 2021/0289239 | A1* | 9/2021 | Falleri | H04N 21/2353 |
| 2023/0007932 | A1* | 1/2023 | Siddiqui | H04W 12/08 |
| 2023/0017384 | A1* | 1/2023 | Woodward | G06F 16/9038 |
| 2023/0028302 | A1* | 1/2023 | Kyleman | G06F 16/93 |
| 2023/0360158 | A1* | 11/2023 | Maharaja | G06Q 50/18 |
| 2024/0070276 | A1* | 2/2024 | Gray | G06F 21/577 |

OTHER PUBLICATIONS

"Automated Asset Migration," Adobe, Web Page <https://helpx.adobe.com/enterprise/using/migrate-assets-to-enterprise-account.html> accessed on Aug. 19, 2022 (9 Pages).

* cited by examiner

SYSTEMS AND METHODS FOR LINKING REMOTE FILE STORAGE

BACKGROUND

Users are frequently required to provide files to third-party services for identity verification, backup, or other purposes. Providing these files to a number of services may require users to search for files individually through several storage services and provide files separately for each third-party service, which may be a time-consuming and frustrating matter.

BRIEF SUMMARY

Users typically interact with a variety of cloud platforms and online services that may require uploads of documents or other files to function. For example, a website for establishing a financial account may require an upload of an identification card or other document to establish proof of identity. An online portal for a rental agency or a service that requires evaluating the user's line of credit may require uploads of financial statements. Other services may require documents establishing proof of residence, including utility statements, rental agreements, or the like. Users traditionally must interact with each upload service individually, often downloading the required document locally, then re-uploading it to the service to provide the needed document.

This established way of providing documents creates additional work for the user, which may discourage users from trying out new products or services if the barrier of navigating a separate upload system adds frustration. Furthermore, users may be hesitant to provide entire documents to a third party when only a subset of the document is needed. For example, a user may not wish to provide a scan of an identification card to several businesses when not all of the information on the identification card is strictly necessary. Similarly, statements and records to establish credit or residence may disclose more information than the user wishes to provide.

In contrast to these conventional techniques for providing documents and other files, example embodiments described herein establish links between file storage services that facilitate simpler transactions of files to third parties. Users may activate an agent application on a local device that gathers information about files typically used for identification, banking, or other services. The agent application may then recommend certain files to provide to a file storage host, and third-party services may be redirected to the file storage host for required files. Additionally, the file storage host may be directed by the user to provide limited forms of the uploaded files, rather than the full file, such as only providing relevant lines from statements as plain data rather than providing entire statement documents. The system may then establish a persistent link between the file requester and the element where the file is stored, establishing the requester as authorized to quickly request certain classes of files.

Accordingly, the present disclosure sets forth systems, methods, and apparatuses that simplify the process of providing files to remote cloud services. There are many advantages of these and other embodiments described herein. For instance, users may be more willing to try various online services knowing that the process of providing documents is streamlined and secure. The increased willingness to sign up for new services will enable online businesses to attract new customers while maintaining strong security practices. In addition, the ability to transfer limited information from files rather than entire files may enable faster transactions and cut server costs needed to process the transfer of large image or document files. Finally, the ability to rapidly transfer a customer's documents and information from documents provides a platform for businesses to innovate and easily obtain new types of files or documents from users that may enhance the user experience.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
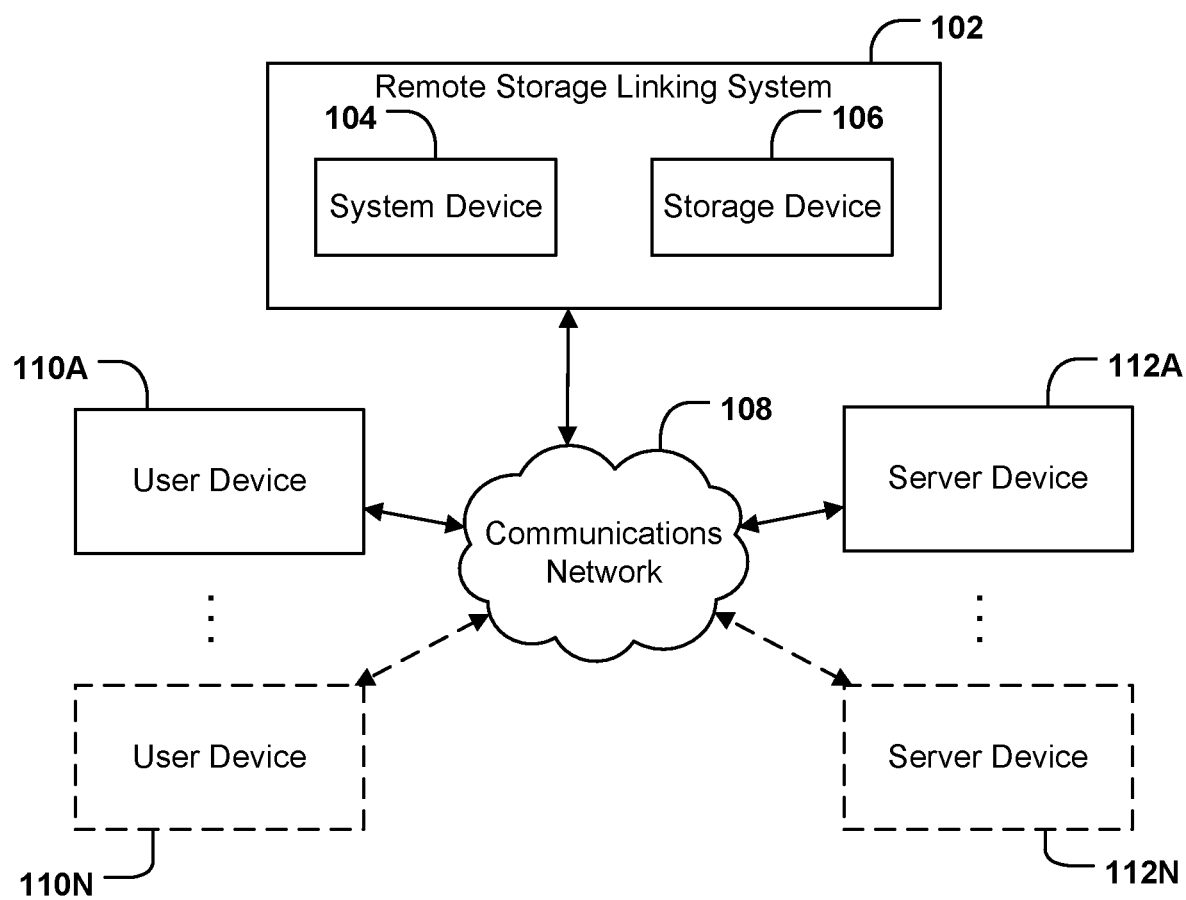
FIG. 1 illustrates a system in which some example embodiments may be used to link remote and local file storage.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "file usage classification model" refers to a data construct that is configured to assign a file usage category to an input file based on the input file contents and/or metadata, where the metadata may include file type, file modification and file creation times, file permissions, file encoding, file storage location, file owner, additional metadata specific to the file type, and the like. The file usage classification model may be a trained machine learning model, such as a neural network. Alternatively, the file usage classification model may be a rules-based model (e.g., a tree-based model) configured to follow a defined set of rules and/or operations to determine a file usage. For example, a set of document files may have different usage categories such as bank statements, rent payments, paychecks, medical bills, shopping receipts, or the like, despite having similar file types and other general metadata. The file usage classification model may further utilize data from the documents to distinguish the example usage categories, for example, categorizing documents containing the name of a landlord as bank statements, or documents containing a hospital logo as a medical bill. In example embodiments where the file usage classification model is a trained machine learning model, the file usage classification model may include optical character recognition, natural language processing, image recognition, and/or additional relevant models to receive data from input files.

System Architecture

Example embodiments described herein may be implemented using any of a variety of computing devices or servers. To this end, FIG. 1 illustrates an example environment within which various embodiments may operate. As illustrated, a remote storage linking system 102 may include a system device 104 in communication with a storage device 106. Although system device 104 and storage device 106 are described in singular form, some embodiments may utilize more than one system device 104 and/or more than one storage device 106. Additionally, some embodiments of the remote storage linking system 102 may not require a storage device 106 at all. Whatever the implementation, the remote storage linking system 102, and its constituent system device(s) 104 and/or storage device (s) 106 may receive and/or transmit information via communications network 108 (e.g., the Internet) with any number of other devices, such as one or more of user device 110A through user device 110N and/or server device 112A through server device 112N.

System device 104 may be implemented as one or more servers, which may or may not be physically proximate to other components of remote storage linking system 102. Furthermore, some components of system device 104 may be physically proximate to the other components of remote storage linking system 102 while other components are not. System device 104 may receive, process, generate, and transmit data, signals, and electronic information to facilitate the operations of the remote storage linking system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the remote storage linking system 102. Storage device 106 may store information relied upon during operation of the remote storage linking system 102, such as various files and associated metadata that may be used by the remote storage linking system 102, data and documents to be analyzed using the remote storage linking system 102, or the like. In addition, storage device 106 may store control signals, device characteristics, and access credentials enabling interaction between the remote storage linking system 102 and one or more of the user devices 110A-110N or server devices 112A-112N.

The one or more user device 110A-110N may be embodied by any computing devices known in the art. Similarly, the one or more server devices 112A-112N may be embodied by any computing devices known in the art, such as desktop or laptop computers, tablet devices, smartphones, or the like. The one or more user devices 110A-110N and the one or more server devices 112A-112N need not themselves be independent devices, but may be peripheral devices communicatively coupled to other computing devices.

Although FIG. 1 illustrates an environment and implementation in which the remote storage linking system 102 interacts with one or more of user devices 110A-110N and/or server devices 112A 112N, in some embodiments users may directly interact with the remote storage linking system 102 (e.g., via input/output circuitry of system device 104), in which case a separate server device (e.g., any of server devices 112A through 112N) may not be utilized. Whether by way of direct interaction or via a separate server device, a user may communicate with, operate, control, modify, or otherwise interact with the remote storage linking system 102 to perform the various functions and achieve the various benefits described herein.

Example Implementing Apparatuses

Figure 2:
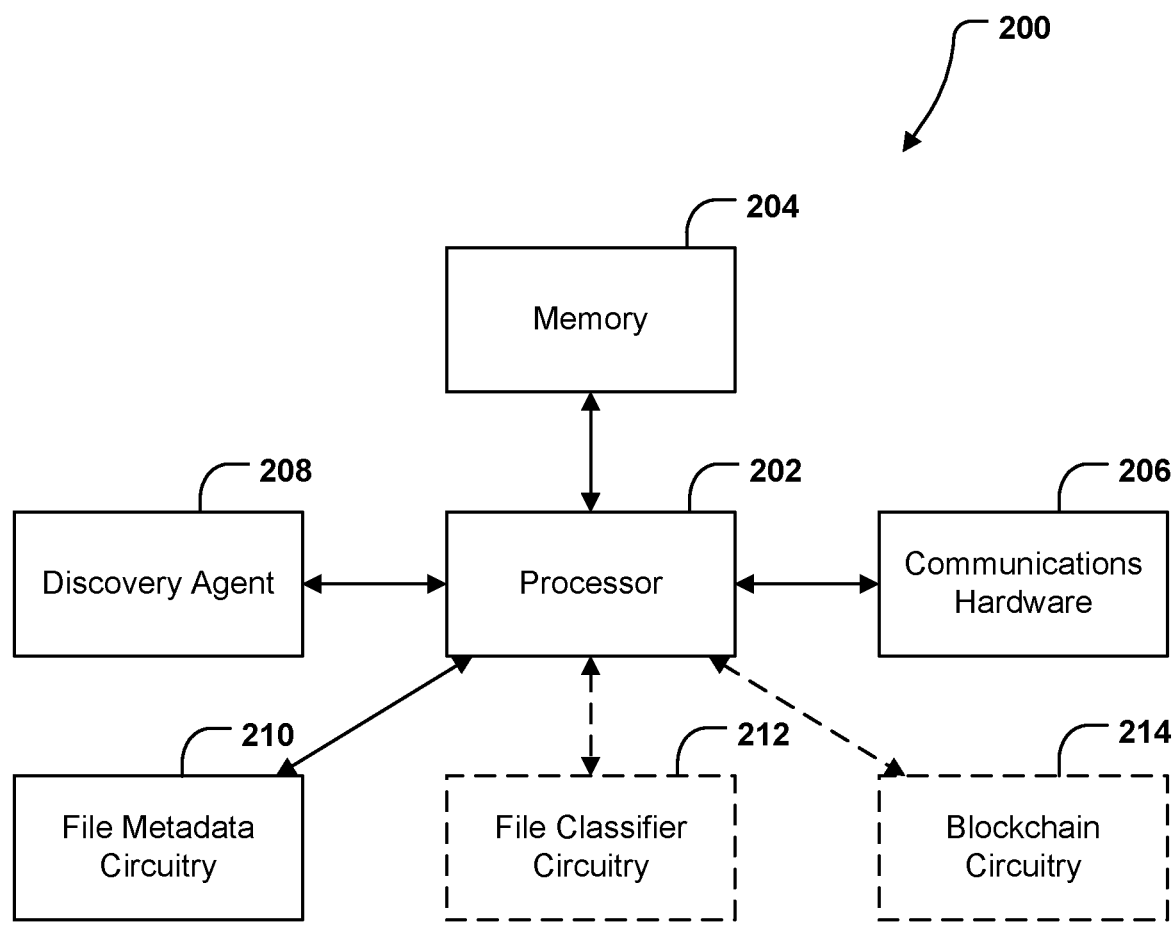
FIG. 2 illustrates a schematic block diagram of example circuitry embodying a device that may perform various operations in accordance with some example embodiments described herein.

System device 104 of the remote storage linking system 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, discovery agent 208, file metadata circuitry 210, file classifier circuitry 212, and blockchain circuitry 214, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 3A-3B and 4-8.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a discovery agent 208 that analyzes user activity data to discover files. The discovery agent 208 may utilize processor 202, memory 204, or any other hardware component included in the apparatus 200 to perform these operations, as described in connection with FIGS. 3A-3B and 4-8 below. The discovery agent 208 may further utilize communications hardware 206 to gather data from a variety of sources (e.g., user device 110A through user device 110N or storage device 106, as shown in FIG. 1), and/or exchange data with a user, and in some embodiments may utilize processor 202 and/or memory 204 to discover files.

In addition, the apparatus 200 further comprises a file metadata circuitry 210 that analyzes discovered files to find associated metadata. The file metadata circuitry 210 may utilize processor 202, memory 204, or any other hardware component included in the apparatus 200 to perform these operations, as described in connection with FIGS. 3A-3B and 4-8 below. The file metadata circuitry 210 may further utilize communications hardware 206 to gather data from a variety of sources (e.g., user device 110A through user device 110N or storage device 106, as shown in FIG. 1), and/or exchange data with a user, and in some embodiments may utilize processor 202 and/or memory 204 to find associated metadata.

In addition, the apparatus 200 may further comprise a file classifier circuitry 212 that utilizes a file classification model to assign file categories. The file classifier circuitry 212 may utilize processor 202, memory 204, or any other hardware component included in the apparatus 200 to perform these operations, as described in connection with FIGS. 3A-3B and 4-8 below. The file classifier circuitry 212 may further utilize communications hardware 206 to gather data from a variety of sources (e.g., user device 110A through user device 110N or storage device 106, as shown in FIG. 1), and/or exchange data with a user, and in some embodiments may utilize processor 202 and/or memory 204 to assign file categories.

In addition, the apparatus 200 may further comprise a blockchain circuitry 214 that creates records on a distributed ledger of file activity. The blockchain circuitry 214 may utilize processor 202, memory 204, or any other hardware component included in the apparatus 200 to perform these operations, as described in connection with FIGS. 3A-3B and 4-8 below. The blockchain circuitry 214 may further utilize communications hardware 206 to gather data from a variety of sources (e.g., user device 110A through user device 110N or storage device 106, as shown in FIG. 1), and/or exchange data with a user, and in some embodiments may utilize processor 202 and/or memory 204 to create records on a distributed ledger.

Although components 202-214 are described in part using functional language, it will be understood that the particular implementations necessarily include the use of particular hardware. It should also be understood that certain of these components 202-214 may include similar or common hardware. For example, the discovery agent 208, file metadata circuitry 210, file classifier circuitry 212, and blockchain circuitry 214 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry," with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the discovery agent 208, file metadata circuitry 210, file classifier circuitry 212, and blockchain circuitry 214 may leverage processor 202, memory 204, or communications hardware 206 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, or communications hardware 206 for enabling any functions not performed by special-purpose hardware elements. In all embodiments, however, it will be understood that the discovery agent 208, file metadata circuitry 210, file classifier circuitry 212, and blockchain circuitry 214 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third-party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of graphical user interfaces and flowcharts.

Example Operations

Turning to FIGS. 3A-3B and 4-8, example flowcharts are illustrated that contain example operations implemented by example embodiments described herein. The operations illustrated in FIGS. 3A-3B and 4-8 may, for example, be performed by system device 104 of the remote storage linking system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, discovery agent 208, file metadata circuitry 210, file classifier circuitry 212, blockchain circuitry 214, and/or any combination thereof. It will be understood that user interaction with the remote storage linking system 102 may occur directly via communications hardware 206, or may instead be facilitated by a separate user device (e.g., any of the storage devices 110A-110N, as shown in FIG. 1), and which may have similar or equivalent physical componentry facilitating such user interaction.

Figure 3A:
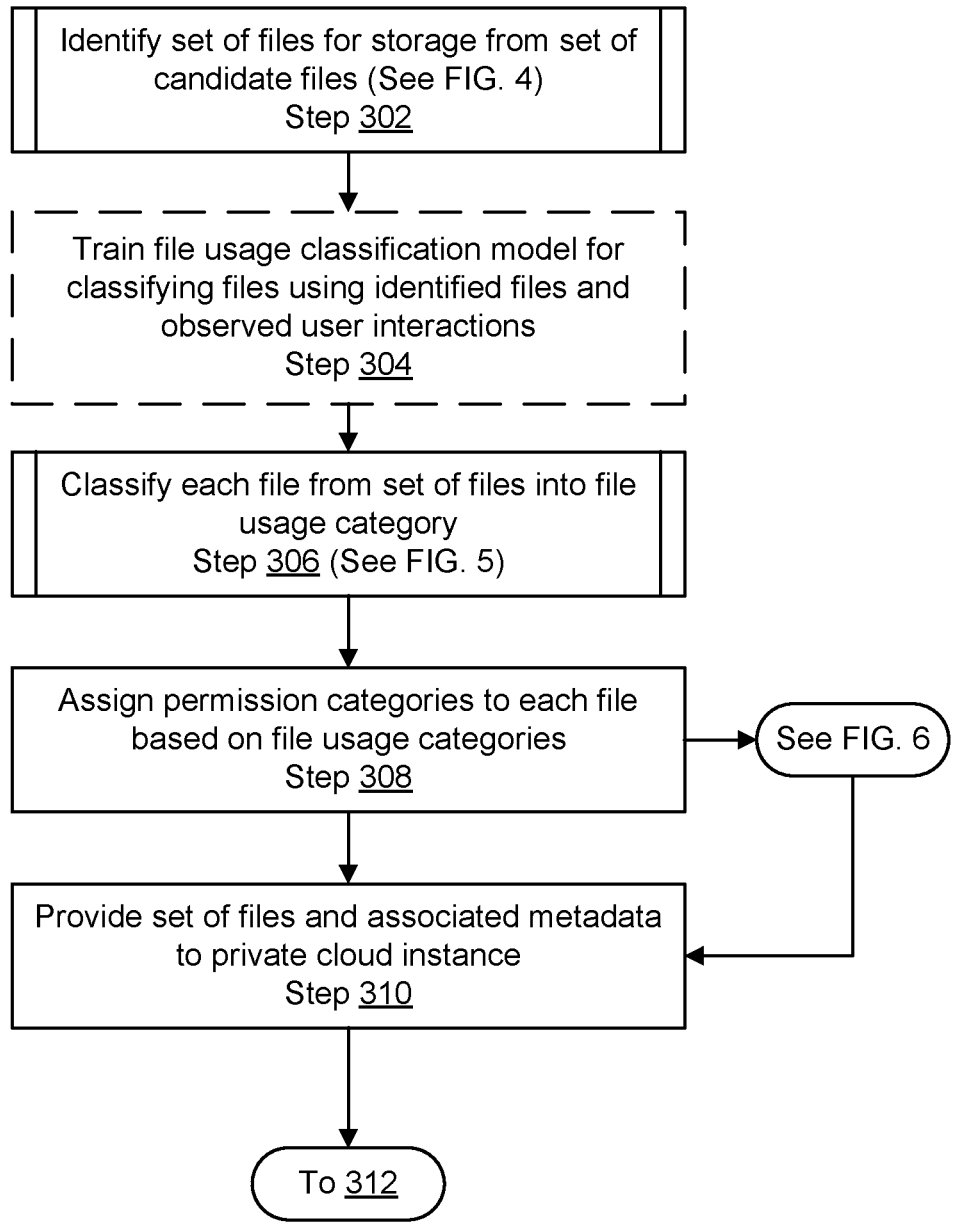
FIG. 3A illustrates an example flowchart for discovering a set of files for storage, in accordance with some example embodiments described herein.

Turning first to FIG. 3A, example operations are shown for discovering a set of files for storage. As shown by operation 302, the apparatus 200 includes means, such as processor 202, memory 204, communications hardware 206, discovery agent 208, or the like, for identifying a set of files for storage from a set of candidate files. The discovery agent 208 may identify the set of files for storage using the example operations depicted in FIG. 4, described in detail below.

Figure 4:
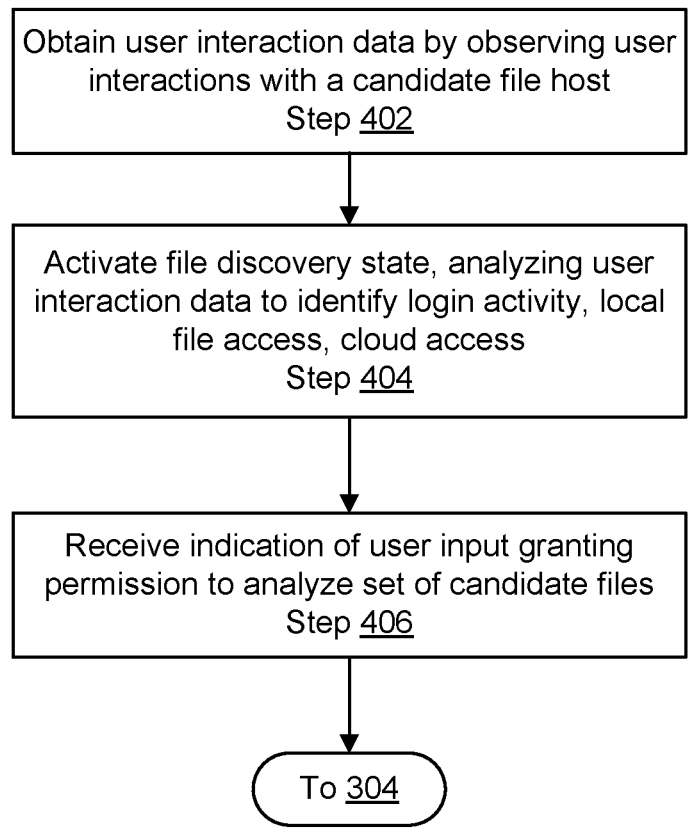
FIG. 4 illustrates an example flowchart for identifying the set of files for storage from the set of candidate files, in accordance with some example embodiments described herein.

Turning to FIG. 4, example operations are shown for identifying the set of files for storage from the set of candidate files. As shown by operation 402, the apparatus 200 includes means, such as processor 202, memory 204, communications hardware 206, discovery agent 208, or the like, for obtaining user interaction data by observing one or more user interactions with a candidate file host. The discovery agent 208, may continue to obtain user interaction data as long as the connection to the candidate file host remains active. The candidate file host may be a remote server device 112A, and/or may be a local user device 110A in the event the discovery agent 208 observes interactions with local files. The user interactions may be obtained by recording activities performed by the user that fall within the granted permissions and within the range of activities defined as observable to the discovery agent 208.

As shown by operation 404, the apparatus 200 includes means, such as processor 202, memory 204, communications hardware 206, discovery agent 208, or the like, for activating a file discovery state. The discovery agent 208 acting in the file discovery state analyzes the one or more user interactions including login activity, local files access, and cloud access. In some embodiments, the discovery agent 208 may operate abstractly as a finite state machine, and the file discovery state may be a machine state in which the discovery agent 208 operates. While operating in the file discovery state, the discovery agent 208 may be configured to monitor certain user activities as specified by the permissions granted in operation 402. One example activity that may be monitored includes login activity. The discovery agent 208 may gather information about which services a user may access through a login. For example, the discovery agent 208 may record that a user frequently accesses a banking application, a portal used for making mortgage payments, an investment and trading platform, or the like. The list of user logins and frequency may indicate the categories of files for which the user is likely to require access or sharing permissions. Another example activity that may be monitored includes local file access and cloud file access. The discovery agent 208 may monitor local and cloud file access to identify frequently accessed files that may be candidate files for upload. The discovery agent 208 may analyze these and other data together to identify patterns that may indicate additional candidate files for upload. In some embodiments, after a file is uploaded, it may continue to be locally observed by the discovery agent 208 to observe any changes to the file or the associated metadata of the file.

Finally, as shown by operation 406, the apparatus 200 includes means, such as processor 202, memory 204, communications hardware 206, or the like, for receiving an indication of user input granting permission to analyze one or more user interactions with the set of candidate files. The user input may be received via the communications hardware 206 directly by the remote storage linking system 102, or from one of user device 110A-110N transmitted over communications network 108. The processor 202 may interpret the user input to determine the level of granted permissions, the activities to monitor, the locations to observe for file activity, and other similar permission levels. The user input may also specify permissions to be granted for a certain duration of time, for example, to be renewed after a month, or only granted during certain pre-defined hours of each day. The permissions may also specify certain types of interactions with files, for example, allowing analysis of files downloaded to certain folders, files downloaded via certain applications, or the like.

Returning to FIG. 3A, as shown by operation 304, the apparatus 200 may include means, such as processor 202, memory 204, communications hardware 206, file classifier circuitry 212, or the like, for training a file usage classification model for classifying files using the one or more identified files for storage and observed user interactions on the set of candidate files. The file usage classification model may be a data construct that is configured to assign a file usage category to an input file based on the input file contents and/or metadata, where the metadata may include file type, file modification and file creation times, file permissions, file encoding, file storage location, file owner, additional metadata specific to the file type, and the like. The file usage classification model may be a trained machine learning model, such as a neural network. Alternatively, the file usage classification model may be a rules-based model (e.g., a tree-based model) configured to follow a defined set of rules and/or operations to determine a file usage. For example, a set of document files may have different usage categories such as bank statements, rent payments, paychecks, medical bills, shopping receipts, or the like, despite having similar file types and other general metadata. The file usage classification model may further utilize data from the documents to distinguish the example usage categories, for example, categorizing documents containing the name of a landlord as bank statements, or documents containing a hospital logo as a medical bill. In example embodiments where the file usage classification model is a trained machine learning model, the file usage classification model may include optical character recognition, natural language processing, image recognition, and/or additional relevant models to receive data from input files.

To this end, the file classifier circuitry 212 may direct files for storage detected during operation 302 to the file usage classification model. The file classifier circuitry 212 may further process, format, infill, or otherwise prepare the files for storage to be suitable to provide as input to the file usage classification model.

As shown by operation 306, the apparatus 200 includes means, such as processor 202, memory 204, communications hardware 206, file metadata circuitry 210, or the like, for classifying each file from the set of files for storage into file usage categories. The file metadata circuitry 210 may perform the classification directly, or may utilize a file usage classification model as shown in connection with FIG. 5. The file usage categories may be pre-configured definitions that specify usage, origin, purpose, or other high-level properties of a file. For example, one file usage category may be identification documents, and documents such as a driver's license, proof of residence from a lease application, or the like may be classified in the identification documents file usage category. The identification documents file usage category may be utilized later, for example, when a third party requests several forms of identification for a user, the system may automatically recommend or provide documents from the identification documents category.

In some embodiments, the file metadata circuitry 210 may assign one or more file usage categories to each file from the set of files for storage. For example, a user's most recent electric bill may be categorized as an identification document (providing proof of residence) and may also be classified as a bill.

As shown by operation 308, the apparatus 200 includes means, such as processor 202, memory 204, communications hardware 206, file metadata circuitry 210, or the like, for assigning permission categories to each file from the set of files for storage based on the file usage categories. A permission category may be a data structure that delineates access levels available to a file for various organizations and/or users. For example, a user may assign files to a permission category that grants high-level access to family members, but approved businesses or financial institutions may have limited permissions to read the file, and other users or organizations may not have any access to the file at all. Permission categories may include finer levels of detail that are particular to a file's usage category. For example, a document in the bank statement usage category may potentially belong to a permission category that grants one level of access to see every transaction in the bank statement, and a different level of access to see only the total bank balance, and yet another level of access to see the names and dates of transactions without seeing monetary values of any transactions. Each level of access within a permission category may be assigned to different classes or groups of users and/or organizations.

To this end, the file metadata circuitry 210 may assign various permission categories based on the file usage categories determined in operation 306. The permission categories may be assigned based on a direct mapping, or in some embodiments, a procedural rules-based determination may be followed to assign permission categories. Each file may have as little as zero permission categories (in which case the file may assume a default permission, such as having access only to the file owner) or multiple overlapping categories, which may grant access permissions of different types to different users and organizations.

Figure 6:
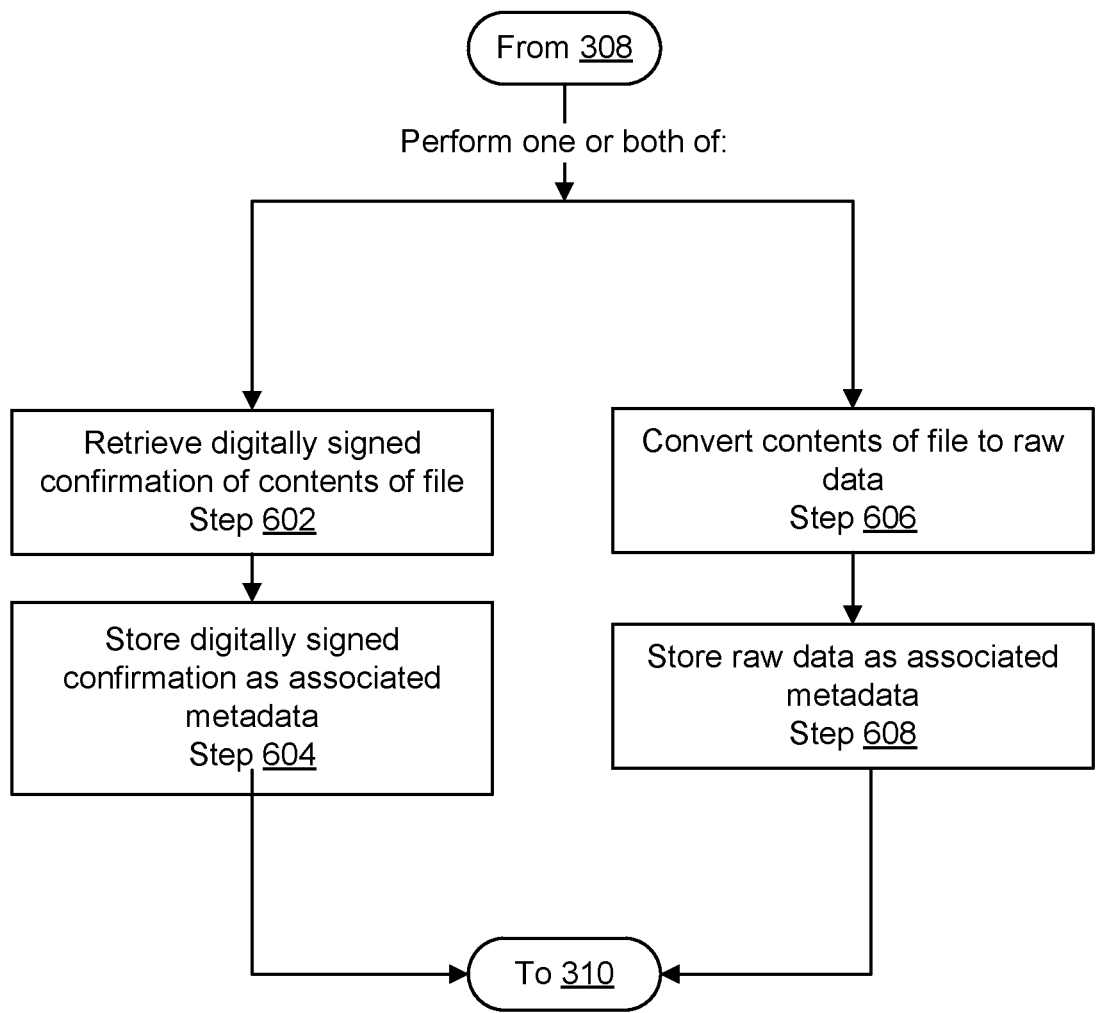
FIG. 6 illustrates an example flowchart for processing files for storage to form associated metadata for storage, in accordance with some example embodiments described herein.

After operation 308, control may flow to operation 310 as shown in FIG. 3A, and control may also flow to one or both of operation 602 and/or operation 606 in FIG. 6. These subsequent operations may be executed in any order, or in parallel, depending on the particular embodiment.

Finally, as shown by operation 310, the apparatus 200 includes means, such as processor 202, memory 204, communications hardware 206, or the like, for providing the set of files for storage and associated metadata to a file storage host, wherein the associated metadata comprises the file usage categories and the permission categories. The file storage host may be one or more remote server devices 112A-112N. In some embodiments, the file storage host may be a cloud platform including a combination of multiple server devices 112A-112N and/or one or more user devices 110A-110N. The transfer of files may be directed to the file storage host identified using authentication or login information provided by the user. Regardless of the physical device or devices providing the file storage host, the communications hardware 206 may provide the set of files for storage identified in operations 302 through 308 and transfer them to the file storage host together with the associated metadata. The associated metadata may include the file usage categories from operation 306, the permission categories from operation 308, and any other relevant information pertaining to the files for upload. The associated metadata may be linked to the file, for example by including an address of the file's physical location, a hash of the file, and/or other unique information to identify the file from the associated metadata.

Figure 3B:
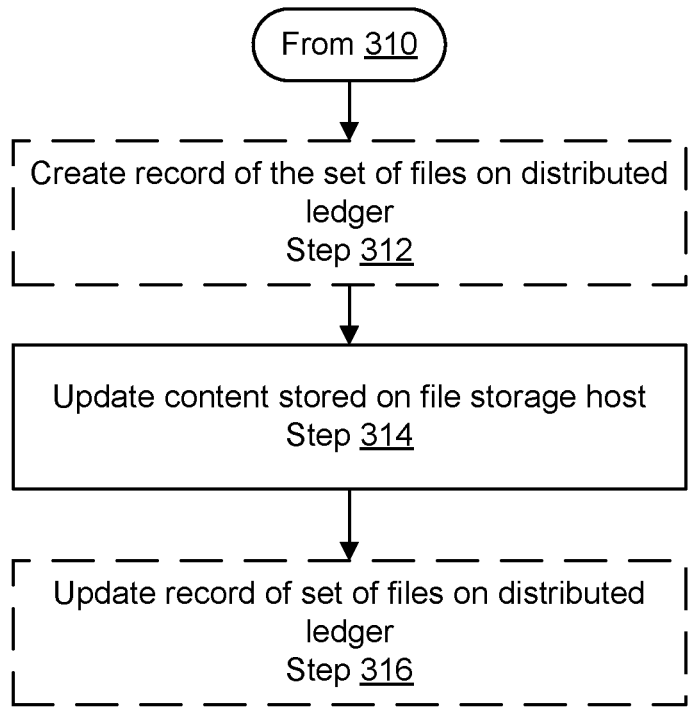
FIG. 3B illustrates an example flowchart for updating and providing records of discovered files to a file storage host, in accordance with some example embodiments described herein.

Turning next to FIG. 3B, example operations are shown for updating and providing records of discovered files to a file storage host. As shown by operation 312, the apparatus 200 may include means, such as processor 202, memory 204, communications hardware 206, blockchain circuitry 214, or the like, for creating a record of the set of files for storage on a distributed ledger. The blockchain circuitry 214 may cause the creation of a record of the set of files for storage by broadcasting a record of the transaction to a blockchain network located via the communications network 108. Broadcasting the file transaction may enable nodes of the distributed ledger or blockchain network to validate the transaction and record it in a new block. The blockchain circuitry 214 may digitally sign the broadcast using the signature of the file owner to prove that the owner of the file is the same as the user initiating the file transaction. The digital signing of the broadcast may use the user's private key, and may utilize a key manager or other applications to cause the signing. The transfer may be directed to the file storage host (e.g., one or more of user device 110A through user device 110N), which may be identified using authentication or login information provided by the user.

As shown by operation 314, the apparatus 200 includes means, such as processor 202, memory 204, communications hardware 206, discovery agent 208, or the like, for updating content stored on the file storage host, the content including the set of files for storage. In some embodiments, the discovery agent 208 may continue to keep the file discovery state active (as described below in connection with operation 404) and may continue to obtain user interaction data by observing user interactions. The discovery agent 208 may cause an update of content stored on the file storage host if certain files for upload are modified, removed, replaced, or otherwise are changed to a different state than the record on the file storage host reflects. In the event that the discovery agent 208 detects a change in a file that is marked as a file for storage, or in the event that the discovery agent 208 detects a new file for storage, the discovery agent 208 may similarly update content stored on the file storage host, following the same procedure.

Finally, as shown by operation 316, the apparatus 200 may include means, such as processor 202, memory 204, communications hardware 206, blockchain circuitry 214, or the like, for updating, in the event the set of files for storage is updated, the record of the set of files for storage on the distributed ledger. The blockchain circuitry 214 may broadcast the update to the distributed ledger or blockchain network in the same manner as described above in connection with operation 312. The blockchain circuitry 214 may broadcast an update in response to an update performed by the discovery agent 208 in connection with operation 314, also described above. The blockchain circuitry 214 may broadcast information about the updated or new files to create a record on the distributed ledger of the file update. The broadcast may include identifiers of the files, hashes of the files, or the like. The broadcast may create a block on the distributed ledger that links to a previous block, where the previous block may reflect the initial transfer of the files for upload to the file storage host (e.g., one or more of server devices 112A-112N), or the previous block may be a more recent update of the files for storage. The distributed ledger, over time, may accrue a series of linked blocks that reflect the full history of updates to files stored on the file storage host.

Figure 5:
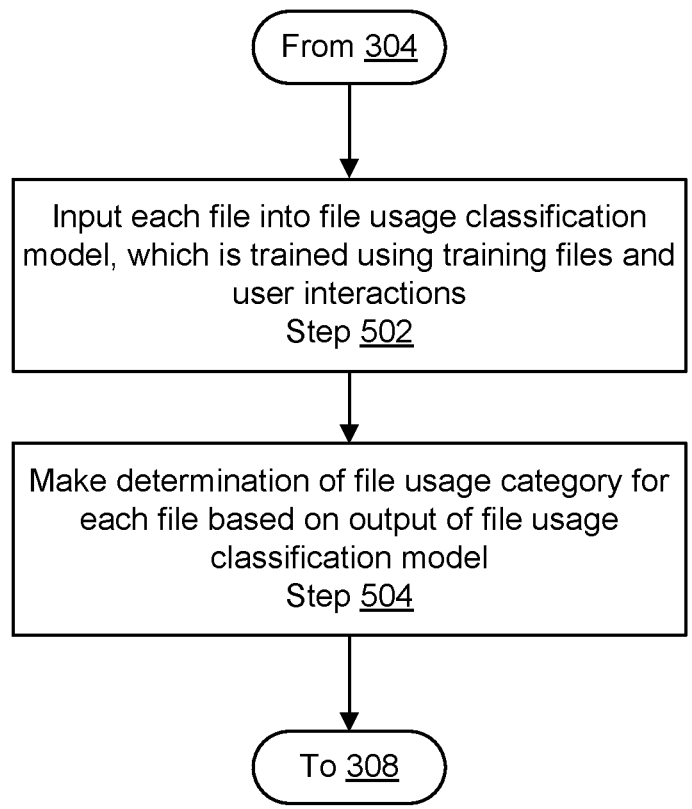
FIG. 5 illustrates an example flowchart for classifying files for upload into usage categories using a file usage classification model, in accordance with some example embodiments described herein.

Turning next to FIG. 5, example operations are shown for classifying files for upload into usage categories using a file usage classification model. As shown by operation 502, the apparatus 200 includes means, such as processor 202, memory 204, communications hardware 206, file classifier circuitry 212, or the like, for inputting each file into a file usage classification model. The file usage classification model is trained using training files for storage and observed user interactions on a training set of candidate files. As described above, the file usage classification model may be a data construct that is configured to assign a file usage category to an input file based on the input file contents and/or metadata, where the metadata may include file type, file modification and file creation times, file permissions, file encoding, file storage location, file owner, additional metadata specific to the file type, and the like. The file usage classification model may be a trained machine learning model, such as a neural network. Alternatively, the file usage classification model may be a rules-based model (e.g., a tree-based model) configured to follow a defined set of rules and/or operations to determine a file usage. For example, a set of document files may have different usage categories such as bank statements, rent payments, paychecks, medical bills, shopping receipts, or the like, despite having similar file types and other general metadata. The file usage classification model may further utilize data from the documents to distinguish the example usage categories, for example, categorizing documents containing the name of a landlord as bank statements, or documents containing a hospital logo as a medical bill. In example embodiments where the file usage classification model is a trained machine learning model, the file usage classification model may include optical character recognition, natural language processing, image recognition, and/or additional relevant models to receive data from input files.

To this end, the file classifier circuitry 212 may provide each file into the file usage classification model. The file classifier circuitry 212 may format, process, infill, or otherwise prepare each file to be input to the file usage classification model.

Finally, as shown by operation 504, the apparatus 200 includes means, such as processor 202, memory 204, communications hardware 206, file classifier circuitry 212, or the like, for making a determination of a file usage category for each file for storage based on the output of the file usage classification model. The file classifier circuitry 212 may make the determination of the file usage category by processing the output of the file usage classification model. For example, the file usage classification model may provide probabilities or scores for several different file usage categories, and the file classifier circuitry 212 may simplify the output by assigning the file usage categories to be applied based on a cutoff, a formula, or a similar method.

Turning now to FIG. 6, example operations are shown for processing files for storage to form associated metadata for storage. The apparatus 200 may perform one or both of the series of operations depicted in FIG. 6, beginning with operation 602 or operation 606. The apparatus 200 may perform one, both, or none of the operations depicted depending on the file usage category or other associated metadata related to a particular file.

As shown by operation 602, the apparatus 200 includes means, such as processor 202, memory 204, communications hardware 206, or the like, for retrieving a digitally signed confirmation of the contents of a file from the set of files for storage. The communications hardware 206 may receive the digitally signed confirmation from a remote server device (e.g., any one of server devices 112A through 112N). The confirmation may be received from a trusted third-party host, such as a financial institution, vendor, or government agency. The digitally signed confirmation may express the contents of the file in a compact form, such that the original file does not need to be viewed to utilize the file. For example, a file may contain a scan of a user's passport, which verifies the user's identity but also contains sensitive information the user may want to protect. The passport scan may be provided to a trusted third-party, and the third-party institution may prepare a signed statement verifying that the file does contain a valid passport that identifies the user. When a different vendor requires documents to prove the user's identity, the user may provide the vendor with the digitally signed confirmation of the contents of the passport file, instead of providing the passport file itself.

As shown by operation 604, the apparatus 200 includes means, such as processor 202, memory 204, communications hardware 206, file metadata circuitry 210, or the like, for storing the digitally signed confirmation as the associated metadata for the file. The digitally signed confirmation may be stored locally, for example, using the storage device 106 of the remote storage linking system 102, embodied by memory 204. In some embodiments, the digitally signed confirmation may alternatively or additionally be stored on the remote file storage host (e.g., one or more of server device 112A through server device 112N). The digitally signed confirmation may be stored as associated metadata for the file, in addition to existing associated metadata (e.g., file permission category, file usage category, etc.).

As shown by operation 606, the apparatus 200 includes means, such as processor 202, memory 204, communications hardware 206, file metadata circuitry 210 or the like, for converting the contents of a file from the set of files for storage to a raw data file. The raw data file may be formatted as comma-separated values, JSON, YAML, or any such file format that may be interpreted as plain text without images, text formatting, or the like. The raw data file may include information extracted from the file from the set of files for storage such that the original file may not need to be accessed in order to obtain the data needed from the file. For example, a bank statement file may be stored as a scanned image of the bank statement document, while the raw data including transaction dates, details, amounts, and balances may be extracted from the file and stored in a simple plain text file as comma-separated values. As another example, in some embodiments, a raw data file of a bank statement file may include a formatted list of bank transactions showing transaction amounts and transaction dates where personal information from the bank statement may be redacted. To this end, the file metadata circuitry 210 may parse each file from the set of files for storage and generate a corresponding raw data file. The rules used to extract raw data from each file may depend on the classification of the file and other associated metadata, such as the file usage category.

Finally, as shown by operation 608, the apparatus 200 includes means, such as processor 202, memory 204, communications hardware 206, file metadata circuitry 210, or the like, for storing the raw data file as the associated metadata for the file. The raw data file may be stored locally, for example, using the storage device 106 of the remote storage linking system 102, embodied by memory 204. In some embodiments, the raw data file may alternatively or additionally be stored on the remote file storage host (e.g., one or more of server device 112A through server device 112N). The raw data file may be stored as associated metadata for the file, in addition to existing associated metadata (e.g., file permission category, file usage category, etc.).

Figure 8:
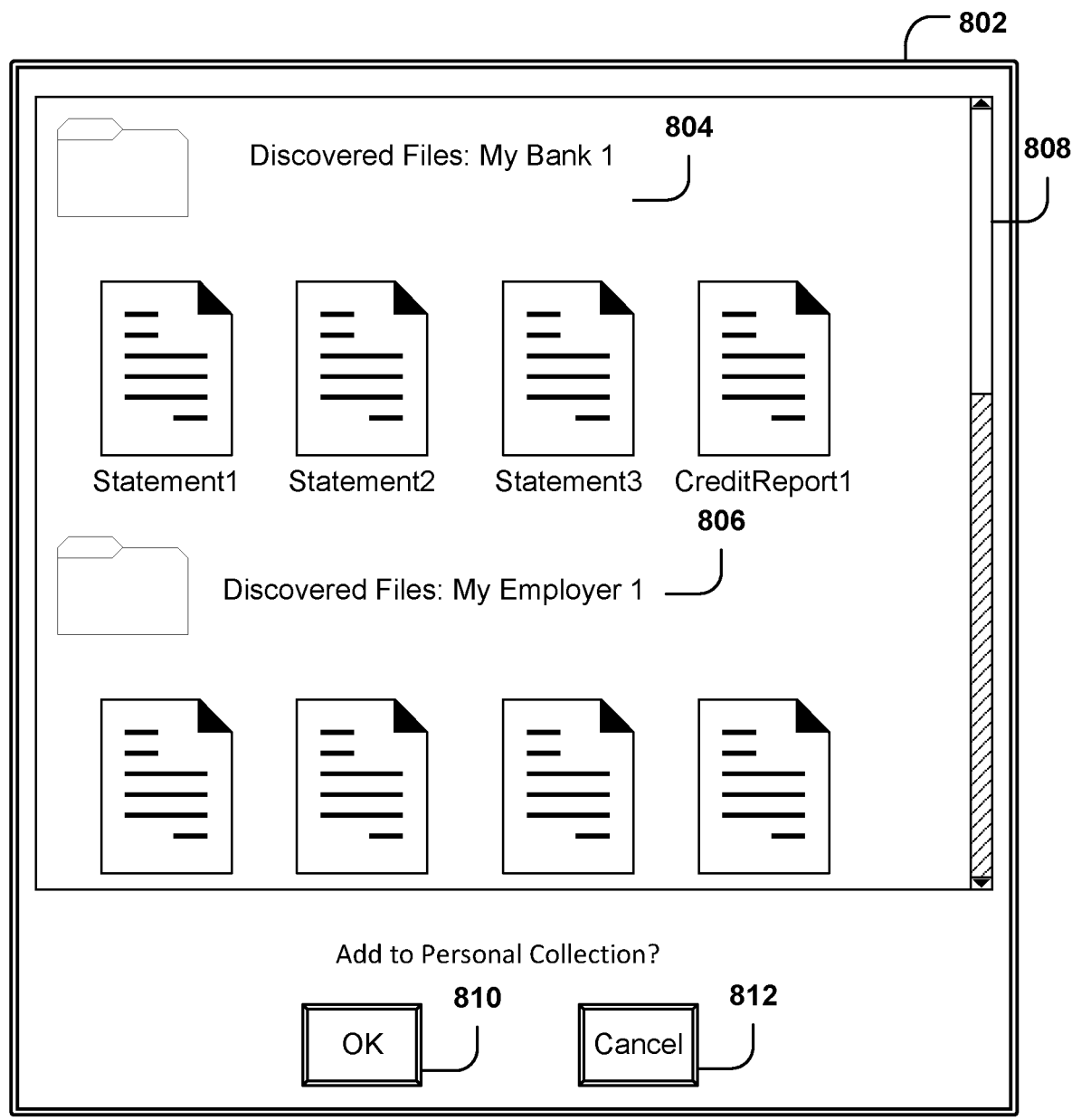
FIG. 8 illustrates an example flowchart for providing requested files from a linked server device, in accordance with some example embodiments described herein.

Turning to FIG. 8, a graphical user interface (GUI) is provided that illustrates a user interaction during the file discovery process. As noted previously, a user may interact with the remote storage linking system 102 by directly engaging with communications hardware 206 of an apparatus 200 comprising a system device 104 of the remote storage linking system 102. In such an embodiment, the GUI shown in FIG. 8 may be displayed to a user by the apparatus 200. Alternatively, a user may interact with the remote storage linking system 102 using a separate user device (e.g., any of user device 110A. through user device 110N, as shown in FIG. 1), which may communicate with the remote storage linking system 102 via communications network 108. In such an embodiment, the GUI shown in FIG. 8 may be displayed to the user by the user device (e.g., user device 110A).

The file discovery prompt 802 may be displayed when the discovery agent 208 acts in file discovery state, and has identified one or more files for storage from the set of candidate files. Files may be organized into one or more sets based on file usage categories, file sources, or the like. For the example GUI shown in FIG. 8, discovered files are organized into file sources, such as "discovered files: my bank 1" 804 and "discovered files: my employer 1" 806. Additional discovered files may be viewable by scrolling using the scroll bar GUI element 808. The user may approve the newly discovered files using an OK button 810, or cancel the file discovery with a cancel button 812.

Figure 7:
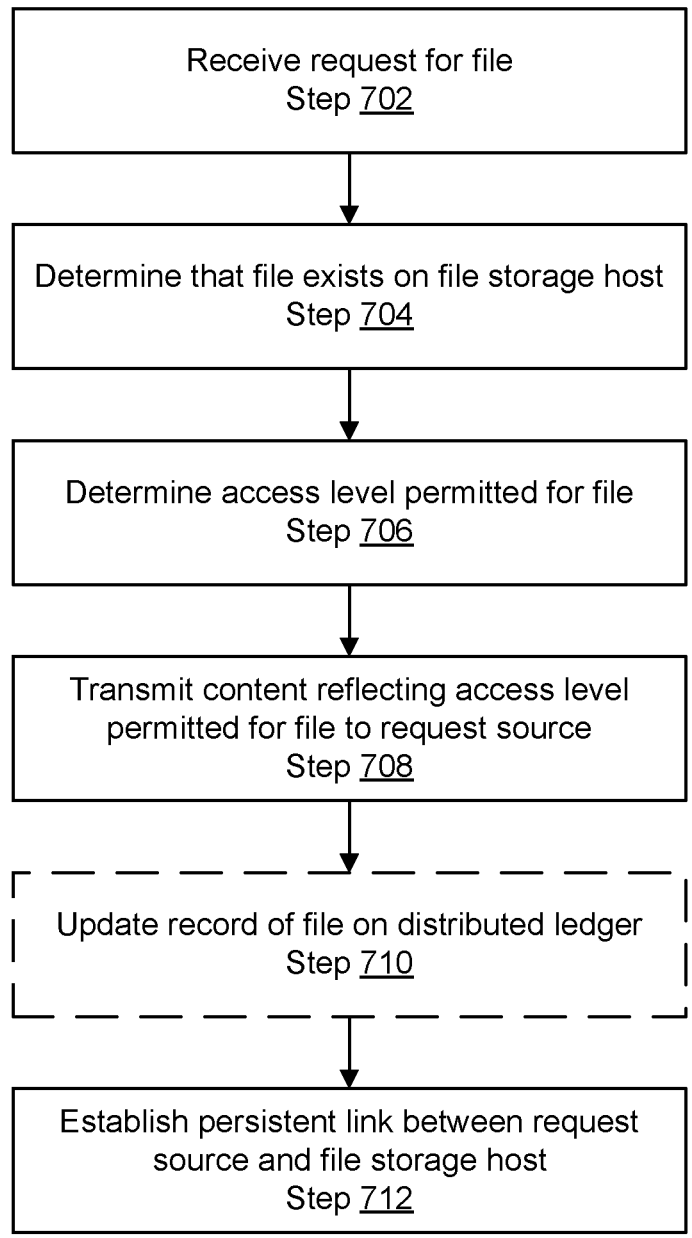
FIG. 7 illustrates an example user interface used in some example embodiments described herein.

Turning now to FIG. 7, example operations are shown for providing requested files from a linked server device (e.g., one of the server devices 112A-112N of FIG. 1). As shown by operation 702, the apparatus 200 includes means, such as processor 202, memory 204, communications hardware 206, or the like, for receiving, from a request source, a request for a file. The request source may be any local or remote device. For example, the request source may originate locally from the remote storage linking system 102, or may originate from one of the server devices 112A-112N. For a request originating from a remote server device (e.g., another one of the server devices 112A-112N of FIG. 1), the request may be received and processed by the communications hardware 206. The request for the file may take the form of a specific file (e.g., "paystub_0001.file"), or the request may be in more general terms, (e.g., "the most recent pay stub"). The request may be clarified and translated by the apparatus 200 in subsequent steps. In some embodiments, the request may be issued in multiple stages, as the remote storage linking system 102 may preferentially provide a more lightweight transmission of raw data, a digitally signed confirmation, or other associated metadata rather than a full specifically requested file.

To this end, the communications hardware 206 may receive the request for the file from the request source, and may process the request source through utilizing the processor 202 or other attached circuitry of the apparatus 200. The apparatus 200 may take additional steps to ensure the validity of the request, for example, by authenticating the request source, taking steps to authorize access to the requested file, or the like. In some embodiments, the apparatus 200 may further utilize communications hardware 206 to provide a notification or confirmation prompt to a user, and the apparatus 200 may require user interaction prior to proceeding beyond operation 702.

In some embodiments, the request source is an enterprise cloud instance and the file is stored on a private cloud instance. The private cloud instance may have been previously initialized and configured according to the operations described in connection with FIGS. 3A-3A and 4-6. Additionally, the enterprise cloud instance may have been previously connected to the remote storage linking system 102 by completing operation 712, in which case the authentication and authorization of the enterprise cloud instance may be streamlined by requiring fewer user interaction instances and fewer actions from processor 202 or other attached circuitry of the apparatus 200. The enterprise cloud instance may be associated with an enterprise including a for-profit business or company, but may also be associated with a, government entity, non-profit organization (such as a credit union), or other similar trusted institutions.

As shown by operation 704, the apparatus 200 includes means, such as processor 202, memory 204, communications hardware 206, file metadata circuitry 210, or the like, for making a determination that the file associated with the request for the file exists on the file storage host. The file metadata circuitry 210 may access records of stored files, located on the storage device 106 embodied by memory 204 to determine if the file exists on the file storage host. In some embodiments, the communications hardware 206 may additionally contact the file storage host if certain conditions are met, for example, if file uploads are in progress, or if a link to the file storage host has not been established for a certain duration of time. The file metadata circuitry 210, after determining that the file exists on the file storage host, may then approve the request for the file from operation 702 to proceed. If the file metadata circuitry 210 determines that the file is unavailable, or is not able to make a determination about whether the file exists on the file storage host, the apparatus may repeat operation 702 after requesting a new request from the request source.

As shown by operation 706, the apparatus 200 includes means, such as processor 202, memory 204, communications hardware 206, file metadata circuitry 210, or the like, for making a determination of an access level permitted for the file. The file metadata circuitry 210 may locate and access associated metadata for the requested file, located on the storage device 106 embodied by memory 204, and/or may request the associated metadata from the file storage host via communications hardware 206. The access level permitted for the file may be found in the associated metadata for the file, described above in detail in connection with operation 308. The access level permitted from the file may be determined by finding the permission category assigned to the file, reading the access levels permitted for various request sources, and looking up the access level permitted for the specific request source initiating the request for the file.

As shown by operation 708, the apparatus 200 includes means, such as processor 202, memory 204, communications hardware 206, file metadata circuitry 210, or the like, for transmitting to the request source, in an instance where the access level is met, content reflecting the access level permitted for the file. The communications hardware 206 may transmit the content related to the file request via communications network 108. The communications hardware 206 may transmit the address of the request source, the identity of the content, and other specifications of the content and file request to the file storage host, which may cause the file storage host to transmit the content to the request source. In some embodiments, the file storage host may transfer the content to the apparatus 200, which may in turn cache the content locally with storage device 106, embodied by memory 204, and transfer the content to the request source. The file and/or content may be staged to the apparatus 200 in this manner in an instance where the file requires additional processing, instances where a local copy of the file is required for synchronization, or other related scenarios.

In some embodiments, the content reflecting the access level permitted for the file includes (i) a copy of the file, (ii) limited access to the file through a file access client, (iii) a raw data file generated by converting the file, (iv) a digitally signed confirmation of the contents of the file, (v) an access token, or (vi) a combination thereof. The file metadata circuitry 210 may select an appropriate file format from the above list of formats when the content from the file request is transmitted to the request source based on the access level permitted for the file. The file metadata circuitry 210 may also utilize the type of file request and the identity of the file request source, and provide the most minimal possible file format that satisfies the file request. For example, rather than providing a copy of the user's social security card, the file metadata circuitry may provide a digitally signed confirmation that the user possesses a valid social security card. For an additional example, instead of providing access to the user's full bank statement, the file metadata circuitry may provide raw data of bank transactions to a mortgage lender to confirm certain details of the user's financial history.

The content format including the full copy of the file refers to an exact copy of the entire file to be transferred to the request source. Limited access to the file through a file access client refers to a method in which the file is not transferred altogether, but is instead viewable through a web browser, specialized viewing application, or the like. The raw data file format may refer to a file formatted as comma-separated values, JSON, YAML, or any such file format that may be interpreted as plain text without images, text formatting, or the like. The raw data file may include information extracted from the file from the set of files for storage such that the original file may not need to be accessed in order to obtain the data needed from the file. In some embodiments, the digitally signed confirmation of the contents of the file may be provided by a third party, such as a financial institution, vendor, or government agency. The digitally signed confirmation may express the contents of the file in a compact form, such that the original file does not need to be viewed to utilize the file. For example, a file may contain a scan of a user's passport, which verifies the user's identity but also contains sensitive information the user may want to protect. The passport scan may be provided to a trusted third-party, and the third-party institution may prepare a signed statement verifying that the file does contain a valid passport that identifies the user. When a different vendor requires documents to prove the user's identity, the user may provide the vendor with the digitally signed confirmation of the contents of the passport file, instead of providing the passport file itself. The access token may be transmitted together with the requested file. The access token may be a data structure that carries an authorization to access the file, and may be provided, for example, to additional parties that are authorized to view the file without requiring the transfer of the file itself. An example access token may be a JSON file including fields such as the creation time and date, an identifier for the user of the remote storage linking system, addresses and/or identities of the remote file storage host, the apparatus 200, and/or the request source, a time-to-live value, and other information needed to authorize access to the requested file.

As shown by operation 710, the apparatus 200 may include means, such as processor 202, memory 204, communications hardware 206, blockchain circuitry 214, or the like, for updating a record of the file on a distributed ledger. The blockchain circuitry 214 may broadcast the update to the distributed ledger or blockchain network in the same manner as described above in connection with operation 312. The blockchain circuitry 214 may broadcast an update in response to a transmission of a file by the communications hardware 206 in connection with operation 708, also described above. The blockchain circuitry 214 may broadcast information about the updated or new files to create a record on the distributed ledger of the file update. The broadcast may include identifiers of the files, hashes of the files, or the like. The broadcast may create a block on the distributed ledger that links to a previous block, where the previous block may reflect the initial transfer of the files for upload to the file storage host (e.g., one or more of server devices 112A-112N), or the previous block may be a more recent update of the files for storage. The distributed ledger, over time, may accrue a series of linked blocks that reflect the full history of updates to files stored on the file storage host.

Finally, as shown by operation 712, the apparatus 200 includes means, such as processor 202, memory 204, communications hardware 206, or the like, for establishing a persistent link between the request source and the file storage host. The file may be originally stored on a file storage host. The communications hardware 206 may transmit one or more security credentials or data structures, such as a shared key, public key, identity certificate, security token, or the like for establishing the persistent link. The persistent link, once established, may enable the apparatus 200 to conduct file transactions between the request source and the file storage host with minimal additional interaction. Establishing the persistent link may, in some embodiments, involve a prompt to the user requesting permission to establish the persistent link. The prompt may list the identity of the request source and the file storage host, and require confirmation or approval from the user before proceeding. Once established, the persistent link between the request source and the file storage host may enable faster communication and file transactions with fewer actions from the remote storage linking system 102.

FIGS. 3A-3B and 4-8 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

As described above, example embodiments provide methods and apparatuses that enable improved linking between remote storage systems. Example embodiments thus provide tools that improve user experience when interacting with multiple institutions that request documents and files of various types. Moreover, embodiments described herein establish persistent links between cloud platforms, avoiding unnecessary user interaction to authenticate each file transaction, greatly improving the user experience, and removing a source of annoyance to the user. As these examples all illustrate, example embodiments contemplated herein provide technical solutions that solve real-world problems faced by users providing files to various cloud or remote file storage platforms. The rising prevalence of cloud storage platforms has made the problem more acute, thus increasing the demand for the solutions provided by example embodiments disclosed herein.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
identifying, by a discovery agent, a set of files for storage from a set of candidate files;
determining, by the discovery agent and from the set of files for storage, (a) a first set of candidate files within the set of candidate files to which third-party access has been granted more than a predefined number of times and (b) a second set of candidate files based on at least a user file access pattern;
classifying, by file metadata circuitry, each file from the set of files for storage into file usage categories, wherein (a) each file usage category indicates a corresponding usage of a file for a third-party entity and (b) the classifying of each file is based on whether the file belongs to the first set of candidate files or the second set of candidate files;
assigning, by the file metadata circuitry, permission categories to each file from the set of files for storage, wherein each permission category is based on the corresponding usage of the file for the third-party entity;
providing, by communications hardware, the set of files for storage and associated metadata to a file storage host, wherein the associated metadata comprises the file usage categories and the permission categories; and
updating, by the discovery agent, content stored on the file storage host, the content comprising the set of files for storage.

2. The method of claim 1, wherein identifying the set of files for storage further comprises:
training, by file classifier circuitry, a file usage classification model for classifying files using the set of files for storage and observed user interactions on the set of candidate files.

3. The method of claim 1, wherein classifying each file from the set of files for storage further comprises:
inputting, by file classifier circuitry, each file into a file usage classification model, wherein the file usage classification model is trained using training files for storage and observed user interactions on a training set of candidate files; and
determining, by the file classifier circuitry, a file category for each file for storage based on an output of the file usage classification model.

4. The method of claim 1, further comprising:
creating, by blockchain circuitry, a record of the set of files for storage on a distributed ledger; and
in an instance where the set of files for storage is updated, updating, by the blockchain circuitry, the record of the set of files for storage on the distributed ledger.

5. The method of claim 1, wherein identifying the set of files for storage from the set of candidate files comprises:

obtaining, by the discovery agent, user interaction data by observing one or more user interactions with a candidate file host;
activating, by the discovery agent, a file discovery state, wherein the discovery agent acting in the file discovery state analyzes the user interaction data to identify login activity, local file access, and cloud access; and
receiving, by the communications hardware, an indication of user input granting permission to analyze the set of candidate files.

6. The method of claim 1, further comprising:
retrieving, by the communications hardware, a digitally signed confirmation of the content of a file from the set of files for storage; and
storing, by the communications hardware, the digitally signed confirmation as the associated metadata for the file.

7. The method of claim 1, further comprising:
converting, by the file metadata circuitry, the content of a file from the set of files for storage to a raw data file; and
storing, by the communications hardware, the raw data file as the associated metadata for the file.

8. An apparatus comprising:
a discovery agent configured to:
identify a set of files for storage from a set of candidate files, and
determine, from the set of files for storage, (b) a first set of candidate files within the set of candidate files to which third-party access has been granted more than a predefined number of times and (b) a second set of candidate files based on at least a user file access pattern;
file metadata circuitry configured to:
classify each file from the set of files for storage into file usage categories, wherein (a) each file usage category indicates a corresponding usage of a file for a third-party entity and (b) the classifying of each file is based on whether the file belongs to the first set of candidate files or the second set of candidate files, and
assign permission categories to each file from the set of files for storage, wherein each permission category is based on the corresponding usage of the file for the third-party entity; and
communications hardware configured to provide the set of files for storage and associated metadata to a file storage host, wherein the associated metadata comprises the file usage categories and the permission categories;
wherein the discovery agent is further configured to update content stored on the file storage host, the content comprising the set of files for storage.

9. The apparatus of claim 8, wherein the discovery agent is further configured to identify the set of files for storage by:
training a file usage classification model for classifying files using the set of identified files for storage and observed user interactions on the set of candidate files.

10. The apparatus of claim 8, wherein the file metadata circuitry is further configured to classify each file from the set of files for storage by:
inputting each file into a file usage classification model, wherein the file usage classification model is trained using training files for storage and observed user interactions on a training set of candidate files; and determining a file usage category for each file for storage based on an output of the file usage classification model.

11. The apparatus of claim 8, further comprising:
blockchain circuitry configured to:
create a record of the set of files for storage on a distributed ledger, and
in an instance where the set of files for storage is updated, update the record of the set of files for storage on the distributed ledger.

12. The apparatus of claim 8, wherein the discovery agent is further configured to identify the set of files for storage from the set of candidate files by:
obtaining user interaction data by observing one or more user interactions with the set of candidate files;
activating, by the discovery agent, a file discovery state, wherein the discovery agent acting in the file discovery state analyzes the user interaction data to identify login activity, local file access, and cloud access; and
receiving an indication of user input granting permission to analyze the set of candidate files.

13. The apparatus of claim 8, wherein the communications hardware is further configured to:
retrieve a digitally signed confirmation of the content of a file from the set of files for storage; and
store the digitally signed confirmation as the associated metadata for the file.

14. A computer program product comprising at least one non-transitory computer-readable storage medium storing software instructions that, when executed, cause an apparatus to:
identify a set of files for storage from a set of candidate files;
determine, from the set of files for storage, (a) a first set of candidate files within the set of candidate files to which third-party access has been granted more than a predefined number of times and (b) a second set of candidate files based on at least a user file access pattern;
classify each file from the set of files for storage into file usage categories, wherein (a) each file usage category indicates a corresponding usage of a file for a third-party entity and (b) the classifying of each file is based on whether the file belongs to the first set of candidate files or the second set of candidate files;
assign permission categories to each file from the set of files for storage, wherein each permission category is based on the corresponding usage of the file for the third-party entity;
provide the set of files for storage and associated metadata to a file storage host, wherein the associated metadata comprises the file usage categories and the permission categories; and
update content stored on the file storage host, the content comprising the set of files for storage.

15. The computer program product of claim 14, wherein the software instructions, when executed, cause the apparatus to identify the set of files for storage by:
training a file usage classification model for classifying files using the set of identified files for storage and observed user interactions on the set of candidate files.

16. The computer program product of claim 14, wherein the software instructions, when executed, cause the apparatus to classify each file from the set of files for storage by:
inputting each file into a file usage classification model, wherein the file usage classification model is trained using training files for storage and observed user interactions on a training set of candidate files; and
determining a file usage category for each file for storage based on an output of the file usage classification model.

17. The computer program product of claim 14, wherein the software instructions, when executed, further cause the apparatus to:
create a record of the set of files for storage on a distributed ledger; and
in an instance where the set of files for storage is updated, update the record of the set of files for storage on the distributed ledger.

18. The computer program product of claim 14, wherein the software instructions, when executed, further cause the apparatus to:
retrieve a digitally signed confirmation of the content of a file from the set of files for storage; and
store the digitally signed confirmation as the associated metadata for the file.

19. The computer program product of claim 14, wherein the software instructions, when executed, further cause the apparatus to:
convert the content of a file from the set of files for storage to a raw data file; and
store the raw data file as the associated metadata for the file.

20. The method of claim 1, further comprising:
classifying, by the file metadata circuitry, each file from the set of files into a first file usage category and a second file usage category, wherein the second file usage category is different from the first file usage category;
assigning, by the file metadata circuitry and to each file from the set of files, a first permission category based on the first file usage category and a second permission category based on the second file usage category; and
providing, by the communications hardware, the set of files and the associated metadata to the file storage host, wherein the associated metadata comprises the first file usage category, the first permission category, the second file usage category, and the second permission category.

* * * * *